United States Patent
Rechtman (10) Patent No.: US 9,435,227 B2
(45) Date of Patent: Sep. 6, 2016

(54) GAS-TO-LIQUID HEAT EXCHANGE SYSTEM WITH MULTIPLE LIQUID FLOW PATTERNS

(71) Applicant: Nooter/Eriksen, Inc., Fenton, MO (US)

(72) Inventor: Yuri Rechtman, Chesterfield, MO (US)

(73) Assignee: Nooter/Eriksen, Inc., Fenton, MO (US)

( * ) Notice: Subject to any disclaimer, the term of this patent is extended or adjusted under 35 U.S.C. 154(b) by 704 days.

(21) Appl. No.: 13/798,462

(22) Filed: Mar. 13, 2013

(65) Prior Publication Data

US 2014/0260285 A1   Sep. 18, 2014

(51) Int. Cl.
  *F02C 1/00*   (2006.01)
  *F01K 23/10*   (2006.01)
  *F22B 1/18*   (2006.01)
  *F22B 35/00*   (2006.01)

(52) U.S. Cl.
  CPC ............ *F01K 23/10* (2013.01); *F22B 1/1815* (2013.01); *F22B 35/007* (2013.01); *Y02E 20/16* (2013.01)

(58) Field of Classification Search
  CPC .... F01K 23/10; F01K 23/106; F01K 23/108; F22B 35/007; F22B 1/1815; F02C 6/18; Y02E 20/16
  USPC ............ 60/39.5, 39.182, 772; 122/7 R
  See application file for complete search history.

(56) References Cited

U.S. PATENT DOCUMENTS

| 4,318,366 A * | 3/1982 | Tompkins ............. F22D 1/12 122/20 B |
| 4,470,449 A | 9/1984 | Ziebold |
| 6,508,206 B1 | 1/2003 | Rechtman |
| 6,813,888 B2 * | 11/2004 | Raiko ............. F22D 1/40 60/653 |
| 7,621,237 B2 | 11/2009 | Krowech et al. |
| 7,874,162 B2 | 1/2011 | Tomlinson et al. |
| 2011/0011057 A1 | 1/2011 | Bellows |
| 2013/0192542 A1* | 8/2013 | Gries ............. F22D 1/02 122/421 |

OTHER PUBLICATIONS

International Search Report, International Patent Application No. PCT/US13/74140, mailed on Mar. 20, 2014, 11 pages.

* cited by examiner

*Primary Examiner* — Kenneth Bomberg
*Assistant Examiner* — Jason T Newton
(74) *Attorney, Agent, or Firm* — Lewis Rice LLC (57) ABSTRACT

Systems and methods for the design of a heat recovery steam generator (HRSG) or similar system that is designed to extract heat from hot gases flowing through a duct which utilizes an external liquid-to-liquid heat exchanger for pre-heating feedwater. The systems and methods allow for multiple water flow patterns to adjust the temperature of the feedwater into the gas duct.

23 Claims, 5 Drawing Sheets

GAS-TO-LIQUID HEAT EXCHANGE SYSTEM WITH MULTIPLE LIQUID FLOW PATTERNS

BACKGROUND

1. Field of the Invention

This invention generally relates to gas-to-liquid heat exchange systems and more particularly to a system allowing multiple liquid paths to provide different temperatures of feed liquid entering the system.

2. Description of the Related Art

Natural gas represents a significant source of electrical energy in the United States and other countries. It burns with few emissions and is available throughout much of the world. Its price has also been falling dramatically in recent years as new drilling techniques such as hydraulic fracturing (or fracking) have opened up previously unavailable deposits. Power plants which convert natural gas into electrical energy are efficient and, in comparison to hydroelectric projects and coal-fired plants, are relatively easy and inexpensive to construct.

Figure 1:
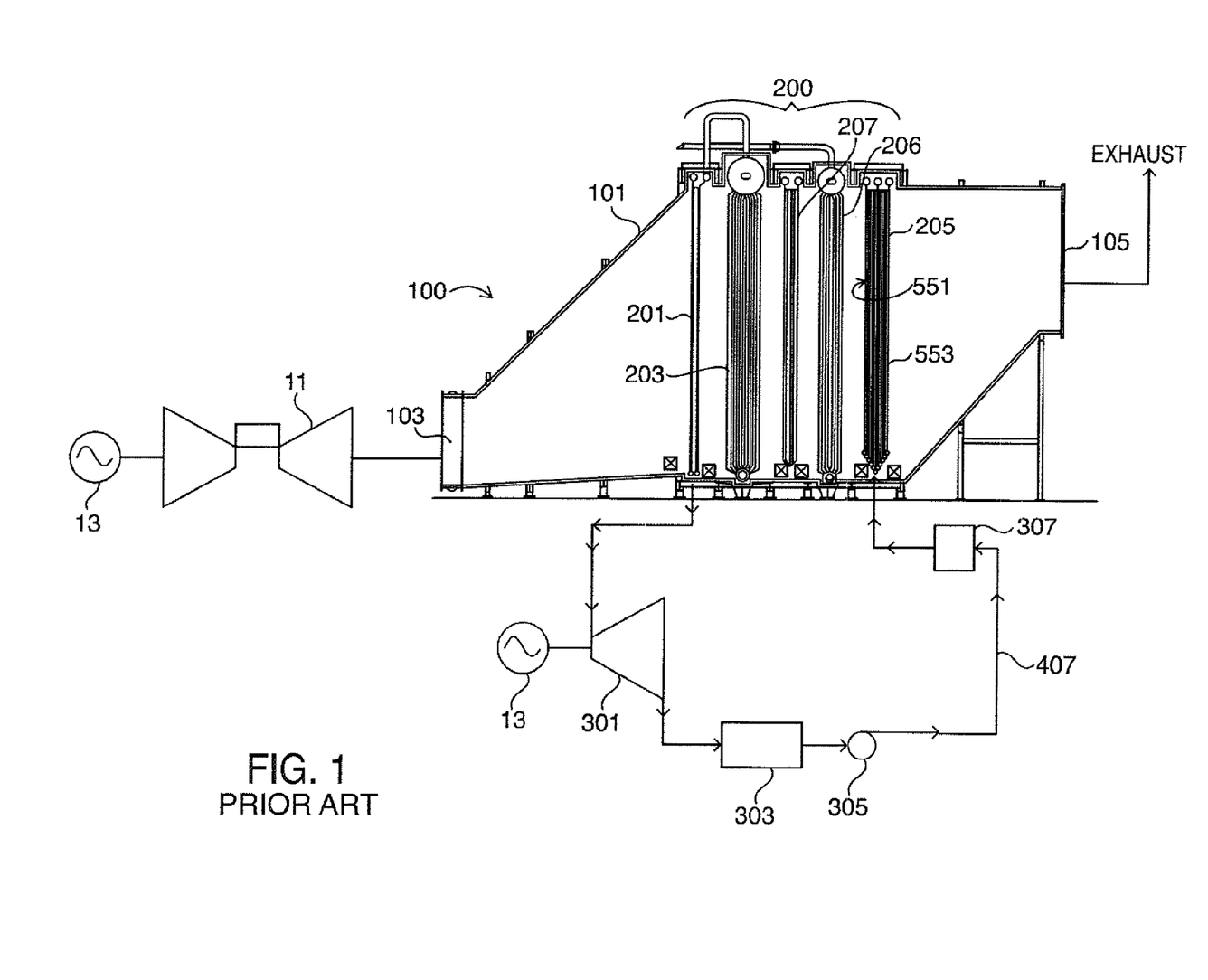
FIG. 1 provides a hybrid block diagram of a power plant including a heat recovery steam generator (HRSG) of the prior art.

In the typical plant as shown in FIG. 1, the natural gas burns in a gas turbine (11), causing the rotor of the turbine (11) to revolve and power an electrical generator (13) to which the rotor is connected. The exhaust gases—essentially carbon dioxide, certain contaminants, and steam—leave the gas turbine at about 1200° F. The heat contained in these gases, thus, can represent a significant additional source of energy. To harness this energy, the typical combined cycle, natural gas-fired power plant also includes a heat recovery steam generator (HRSG) (100) through which the hot exhaust gases pass. The HRSG (100) acts as a gas-to-liquid heat exchanger allowing the heat in the exhaust gas to be captured and reused in a steam turbine (301).

The HRSG (100) includes an inlet duct (101) where gas turbine combustion products are entering (103) and an outlet exhaust end. (105). Exhaust gas flows from the gas turbine (11) into the upstream end (103) of the duct (101). The gas then passes through a channel of tube banks (200) with the working fluid, which includes steam, steam/water mixture, and water. The exhaust gas is heating the working fluid while cooling itself. Once clear of tube banks (200), the gas passes out the downstream end (105) into a stack which directs the exhaust gases to the atmosphere. The HRSG of FIG. 1 is a two-pressure level HRSG. As such, like most HRSGs its tube banks (200) are generally composed of three functional sections within the duct (101). The first is a superheater (201), the second is an evaporator and the third is an economizer (also called a feedwater heater). As a two-pressure system, the high pressure system uses the superheater (201), a high pressure evaporator (203) and high pressure economizer (207). The low pressure system uses the low pressure evaporator (206) and a low pressure economizer (205). These are functional distinctions as tube banks are connected to each other but the functional components are arranged basically in that order from the upstream end (103) to the downstream end (105).

The liquid in tube banks (referred to as feedwater (407) herein) enters the low pressure economizer (205) as a liquid. The low pressure economizer (205) elevates the temperature of the feedwater (407). The high temperature feedwater (407) then flows into the low pressure evaporator (206) which converts a part of the feedwater (407) into low pressure saturated steam. A part of the feedwater also goes to the high pressure economizer (207). The high pressure evaporator (203) then converts that incoming water into high pressure steam. The steam from the high pressure evaporator then flow to the superheater (201) which converts the saturated steam into superheated steam. The flow of the feedwater (407) is thus loosely counter to the flow of the gas in the duct (101).

Once the feedwater (407) has been superheated, the superheated steam flows to an external steam turbine (301) which powers another electrical generator (13). After the steam turbine (301), the working fluid (407) will pass into a condenser (303) where steam at a vacuum is condensed back into liquid for reuse through the system. A condensate pump (305) delivers the feedwater (407) back to the economizer (205).

As natural gas commonly contains traces of sulfur as a contaminant which is not easily removable prior to combustion, the combustion of the natural gas in the gas turbine (11) generally causes the sulfur to combine with oxygen to produce sulfur oxides. The combustion process of the gas turbine (11) also involves large quantities of water which is simply present in the atmosphere. So long as the exhaust gases in the duct (101) remain above the acid dew point for the gases, which is generally accepted in the industry as about at least 140° F. for sulfuric acid for the concentration of sulfur expected in most natural gas, the sulfur oxides pass out of the HRSG and into the exhaust stack.

However, unless it is preheated, the feedwater (407) entering tube banks (200) within the duct (101) will generally be at only about 90° F. to about 100° F. and, thus, it is possible that tube banks (200) toward the downstream end (553) of the low pressure economizer (205), commonly called "cold rows," will be at a temperature below the dew point of the exhaust gases (about 140° F. for exhaust gases from natural gas as indicated above). If this should occur, sulfuric acid can condense on tubes (200) toward the downstream end from the sulfur oxides in the flue gas uniting with that water to form sulfuric acid. As sulfuric acid is highly corrosive to the material of tubes (200), such formation can cause damage to tubes (200), eventually requiring a shutdown and repair of the HRSG (100) with all associated costs.

In order to deter the formation of sulfuric acid, manufacturers of HRSGs (100) have attempted to configure the HRSGs (100) such that the feedwater (407) enters the duct (101) at a temperature above the acid dew point for the exhaust gases. Specifically, raising the temperature to about 140° F. prior to the water entering the channel (200) is desired for natural gas operations. While there are a number of ways of doing this, including the use of recirculation pumps, FIG. 1 provides a more sophisticated configuration where the feedwater (407) is fed into the cold input of a liquid-to-liquid heat exchanger (307) external to the duct (101) prior to entering tubes (200) within the duct (101). To provide the hot liquid to the heat exchanger (307), feedwater (407) which has already been heated in the duct (101) is routed out of the duct (101) to the hot input of the heat exchanger (307).

Figure 2:
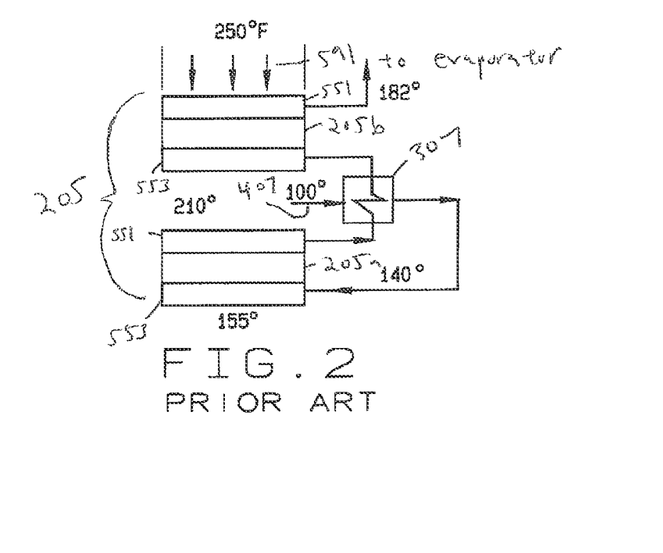
FIG. 2 provides a block diagram of a prior art economizer with external heat exchanger having two sections arranged in series for use in an HRSG such as that of FIG. 1.
Figure 3:
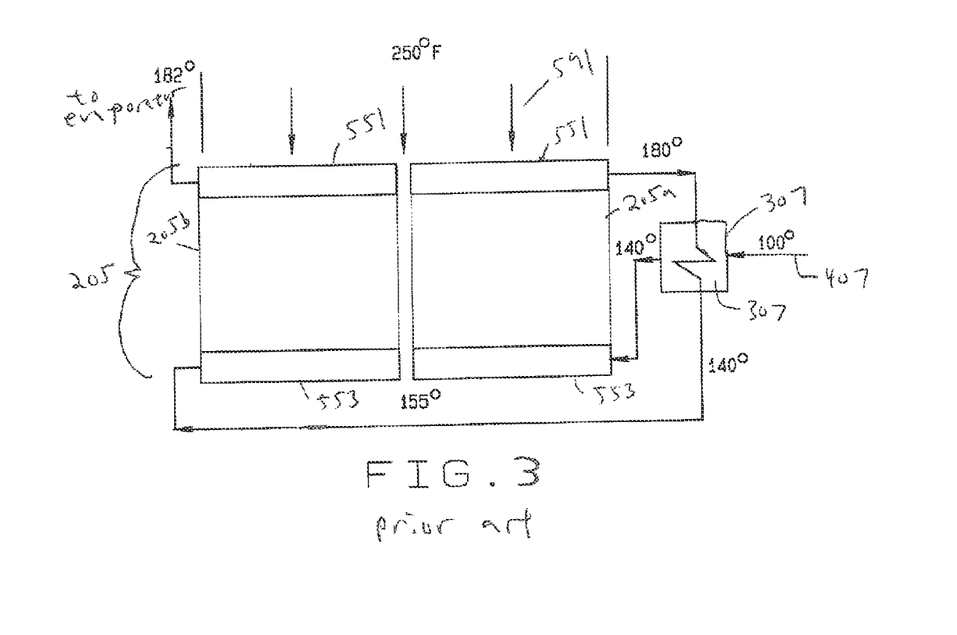
FIG. 3 provides a block diagram of a prior art economizer with external heat exchanger having two sections arranged in parallel for use in an HRSG such as that of FIG. 1.

The routing of partially heated feedwater (407) is accomplished through the use of a low pressure economizer (205) that includes two sections (205a) and (205b) as shown in FIGS. 2 and 3. These sections (205a) and (205b) allow for partially heated water within the low pressure economizer (205) to be sent to the external heat exchanger (307) and then back into the low pressure economizer (205). The sections (205a) and (205b) may be located in a variety of different configurations within the duct (101), but, overall, the sections (205a) and (205b) eliminate the need for a recirculation pump to preheat the feedwater (407), which can thereby simplify operation and provide one less mechanical part with the potential to break down.

FIG. 2 provides an economizer (205) where the sections (205*a*) and (205*b*) are located in series (one after the other) relative to the gas flow (591), while FIG. 3 provides an economizer (205) where the sections (205*a*) and (205*b*) are located in parallel (next to each other) relative to the gas flow (591). Between the two sections (205*a*) and (205*b*), feedwater (407) flows through the hot input on the heat exchanger (307) that is external to gas flow (591). The feedwater (407) immediately from the condenser (303) flows through the cold input of the heat exchanger (307) before entering the economizer (205). The heat exchanger (307) thus elevates the temperature of the feedwater (407) from the condenser (303), which is from about 90° F. to about 100° F., to at least 140° F. before the water (407) enters the downstream tube rows (553) of the economizer section (205*a*). This means that acid condensation on the downstream tube rows (553) of that section (205*a*) generally does not occur.

The systems of FIGS. 1 through 3 work very well for natural gas-fired gas turbines with heat recovery steam generator systems (HRSGs). However, many natural gas-fired power plants are designed to have emergency capability to allow operation when natural gas is not available. While natural gas is always a preferred fuel, sometimes there is simply not enough of it available at the power plant. Most natural gas-fired power plants capable of emergency production are designed to burn an alternative petrochemical in an emergency. Similarly, if the cost of natural gas increases dramatically, these power plants are also more flexible as they can convert to burning alternative materials full-time. The alternative material is often #2 fuel oil, which generally contains a significantly higher sulfur content than natural gas.

When #2 fuel oil is burned in the operation of the power plant of FIGS. 1 through 3, the exhaust gases entering the duct (101) generally include a higher percentage of sulfur than when natural gas is used. This increased percentage of sulfur means that the temperature at which sulfuric acid will condense on the tubes in the exhaust path (200) is increased above the 140° F. temperature at which the feedwater (407) is fed to the tube banks (200). When a recirculation pump is used, this is generally not a problem. However, for designs such as those of FIG. 2 and FIG. 3 that utilize an external heat exchanger, the system is often not capable of providing extra heat to the feedwater (407) to raise it substantially above 140° F. because of the use of different fuel and, thus, sulfuric acid can condense on the cold end tubes of the tube bank (200) designed for the 140° F. input feedwater (407) which would no longer be of sufficient temperature to prevent condensation and a full bypass of all section of the economizer (205) would be required to prevent tube bank (200) corrosion.

SUMMARY

Because of the above problems in the art, described herein are systems and methods for the design of a heat recovery steam generator (HRSG) or similar system that is designed to extract heat from hot gases flowing through a duct which utilizes an external liquid-to-liquid heat exchanger for preheating feedwater. The systems and method allow for a variable water flow pattern to provide preheated water at a variety of different temperatures.

There is described herein, among other things, a piping system for transferring heat from an exhaust gas flow to a feedwater comprising: an economizer including: a first section; a second section; a third section; and a fourth section; wherein the first section, the second section, the third section, and the fourth section are within the gas flow; a heat exchanger which is not within the exhaust gas flow and having a cold input and hot input; and a plurality of valves; wherein the valves can be arranged in a first configuration so a feedwater passes through the system in the following order:
  a) the cold input of the heat exchanger;
  b) the first section of the economizer;
  c) the hot input of the heat exchanger;
  d) the second section of the economizer; and
  e) the third section and the fourth section of the economizer in any order; and wherein the valves can be arranged in a second configuration so a feedwater passes through the system in the following order:
  a) the cold input of the heat exchanger;
  b) the first section of the economizer;
  c) the third section of the economizer;
  d) the hot input of the heat exchanger;
  e) the second section of the economizer; and
  f) the fourth section of the economizer.

In an embodiment of the system, the exhaust gas flow is selected from the group consisting of: exhaust gas from the combustion of natural gas and exhaust gas from the combustion of #2 fuel oil.

In an embodiment of the system, wherein the valves are arranged in the first configuration when the exhaust gas has a relatively lower sulfur content and in the second configuration when the exhaust gas has a relatively higher sulfur content.

In an embodiment of the system, the first section of the economizer and the second section of the economizer are arranged in parallel relative to the exhaust gas flow.

In an embodiment of the system, the first section of the economizer and the second section of the economizer are arranged in series relative to the exhaust gas flow.

In an embodiment of the system, the third section of the economizer and the fourth section of the economizer are arranged in parallel relative to the exhaust gas flow.

In an embodiment of the system, the third section of the economizer and the fourth section of the economizer are arranged in series relative to the exhaust gas flow.

In an embodiment of the system, the plurality of valves includes: a first three-way valve positioned between an upstream face of the first section of the economizer, an upstream face of the third section of the economizer, and the hot input of the heat exchanger; a second three-way valve positioned between an upstream face of the first section of the economizer, an upstream face of the second section of the economizer, and a downstream face of the third section of the economizer; and a first two-way valve positioned between an upstream face of the third section of the economizer and an upstream face of the fourth section of the economizer.

In an embodiment of the system, the plurality of valves further includes a bypass valve which allows for the feedwater to either: enter the cold input of the heat exchanger; or bypass the economizer.

In an embodiment of the system, the feedwater entering the cold input is between about 90° F. and about 100° F.

In an embodiment of the system, when the valves are in the first configuration, the feedwater entering the first section of the economizer is above 140° F.

In an embodiment of the system, the system is part of a heat recovery steam generator (HRSG).

In an embodiment of the system, after the feedwater has passed through either the first configuration or the second configuration, the feedwater is passed to a low pressure evaporator.

There is also described herein a method for controlling the flow of a liquid through a device for exchanging heat between a gas and a liquid, the method comprising: providing a device for exchanging heat between a gas and a liquid, the device including: an economizer including: a first section; a second section; a third section; and a fourth section; wherein the first section, the second section, the third section, and the fourth section are within the gas flow; a heat exchanger which is not within the exhaust gas flow and having a cold input and hot input; using the device in a first configuration wherein liquid passes through the components of the device in the following order:
 a) the cold input of the heat exchanger;
 b) the first section of the economizer;
 c) the hot input of the heat exchanger;
 d) the second section of the economizer; and
 e) the third and the fourth section of the economizer in any order;
when a first exhaust gas forms the exhaust gas flow; and using the device in a second configuration wherein liquid passes through the components of the device in the following order:
 a) the cold input of the heat exchanger;
 b) the first section of the economizer;
 c) the third section of the economizer;
 d) the hot input of the heat exchanger;
 e) the second section of the economizer; and
 f) the fourth section of the economizer;
when a second exhaust gas, different from the first exhaust gas, forms the exhaust gas flow.

In an embodiment of the method, the first exhaust gas is exhaust gas from the combustion of natural gas and the second exhaust gas is exhaust gas from the combustion of #2 fuel oil.

In an embodiment of the method, the first exhaust gas has a relatively lower sulfur content than the second exhaust gas.

In an embodiment of the method, the first section of the economizer and the second section of the economizer are arranged in parallel relative to the exhaust gas flow.

In an embodiment of the method, the first section of the economizer and the second section of the economizer are arranged in series relative to the exhaust gas flow.

In an embodiment of the method, the third t section of the economizer and the fourth section of the economizer are arranged in parallel relative to the exhaust gas flow.

In an embodiment of the method, the third section of the economizer and the fourth section of the economizer are arranged in series relative to the exhaust gas flow.

In an embodiment of the method, the liquid entering the cold input is between about 90° F. and about 100° F.

In an embodiment of the method, in the first configuration, the liquid entering the first section of the economizer is above 140° F.

In an embodiment of the method, in the second configuration, the liquid entering the first section of the economizer is above 230° F.

In an embodiment of the method, the method is performed in a heat recovery steam generator (HRSG).

DESCRIPTION OF PREFERRED EMBODIMENT(S)

This disclosure will discuss systems and methods for the design of a heat recovery steam generator (HRSG) (100) which utilizes an external liquid-to-liquid heat exchanger (307) for preheating condensate (407) and that allows for a variable water flow pattern to alter the temperature that the condensate (407) enters tube banks (200) within the duct (101) based on the gas composition from which the HRSG (100) is recovering heat. Thus, the input temperature of the condensate (407) is variable and the temperature can be selected by altering the chosen pathway.

It should be recognized that, while this disclosure will specifically describe the piping arrangement (500) of an economizer (205) in conjunction with an HRSG (100) designed primarily for capturing heat from natural gas exhaust (591a), the piping arrangement (500) and methodology is equally suitable for HRSGs (100) used for other primary forms of gas-to-liquid heat exchange, and other systems for capturing heat from heated gases. This includes, but is not limited to, systems used to capture heat primarily from the combustion of fossil fuels, such as coal and oil, the incineration of waste, or from other systems that generate heat. Further, as the term "economizer" is effectively a functional definition, components referred to herein as being a part of that section are not intended to be limiting and it is possible, in different embodiments, that the functions of the economizer (205) could be performed by other components. Similarly, other functional positions could also change as the relative position of the portions (e.g. (205a) and (205c)) compared to the heat exchanger (307) is generally more important than the positions of the portions (e.g. (205a) and (205c)) relative to each other.

Figure 4:
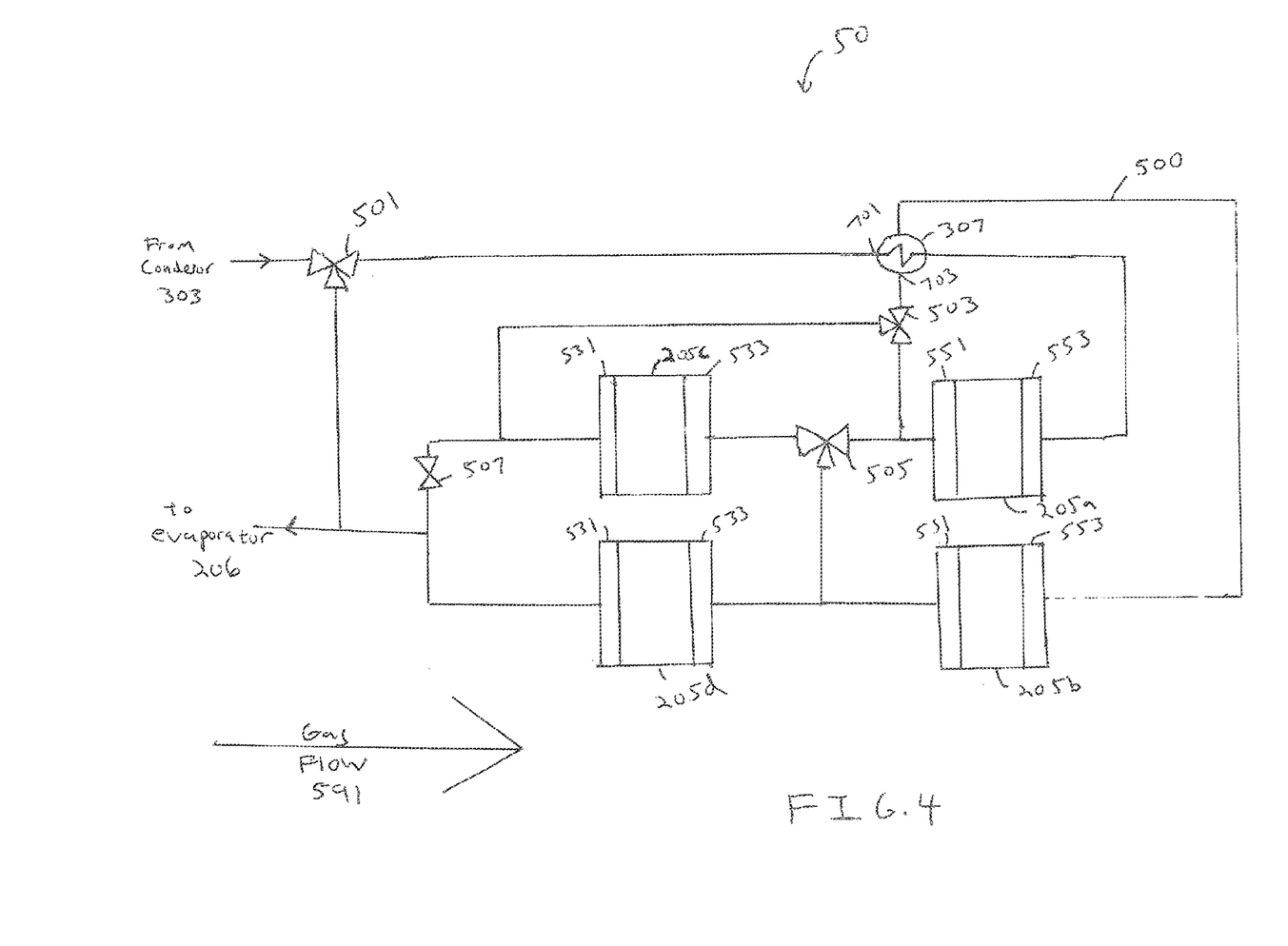
FIG. 4 provides a block diagram of an economizer arrangement for use in an HRSG such as that of FIG. 1 which includes a valve system for switchable operation.

FIG. 4 provides for an embodiment of a system (50) including a pipe arrangement (500) through an HRSG (100) that allows for an alterable pathway based on the composition of the gas flow (591). The HRSG (100) components shown in FIG. 4 are reduced from those shown in FIG. 1 in order to illustrate the specific pathway of fluid through the economizer (205). The remaining components would generally be arranged in a conventional manner as understood by one of ordinary skill. In FIG. 4, the economizer (205) is arranged to have two sections (205a) and (205b) which are shown arranged in parallel as discussed above in conjunction with FIG. 3. However, as would be understood by one of ordinary skill, this arrangement is by no means required and is done for illustrative purposes only. In an alternative embodiment, the economizer (205) could be arranged with sections in series as discussed in conjunction with FIG. 2.

The pipe arrangement (500) generally includes at least three and generally four valves (501), (503), (505), and (507). However, other numbers of valves can be used depending on the preferred organization and the flexibility of different flows desired. Valve (501) is a three-way bypass valve which would be used to avoid sending water into the pipe arrangement (500) if there was a problem with the pipe arrangement (500), such as if it required maintenance, that the capacity of the pipe arrangement (500) was exceeded, or for any other reason. The valves (503), (505), and (507) are designed to allow for the water flow through the pipe arrangement (500) to travel through two different pathways, depending on the type of gas flow (591) being used to heat the water in the pipe arrangement (500). Valves (503) and (505) are generally three-way valves while valve (507) may be a two-way valve.

In the embodiment of FIG. 4, a first three-way valve (503) is positioned between an upstream face (551) of the first section (205a) of the economizer (205), an upstream face (531) of the third section (205c) of the economizer (205), and the hot input (703) of the heat exchanger (307). Note that the "upstream" and "downstream" positions referred to here are for the gas flow, not the feedwater (407). A second three-way valve (505) is positioned between an upstream face (551) of the first section (205a) of the economizer (205), an upstream face (551) of the second section (205b) of the economizer (205), and a downstream face (533) of the third section (205c) of the economizer (205). A two-way valve (507) is also positioned between an upstream face (531) of the third section (205c) of the economizer (205) and an upstream face (531) of the fourth section (205d) of the economizer (205).

Figure 5:
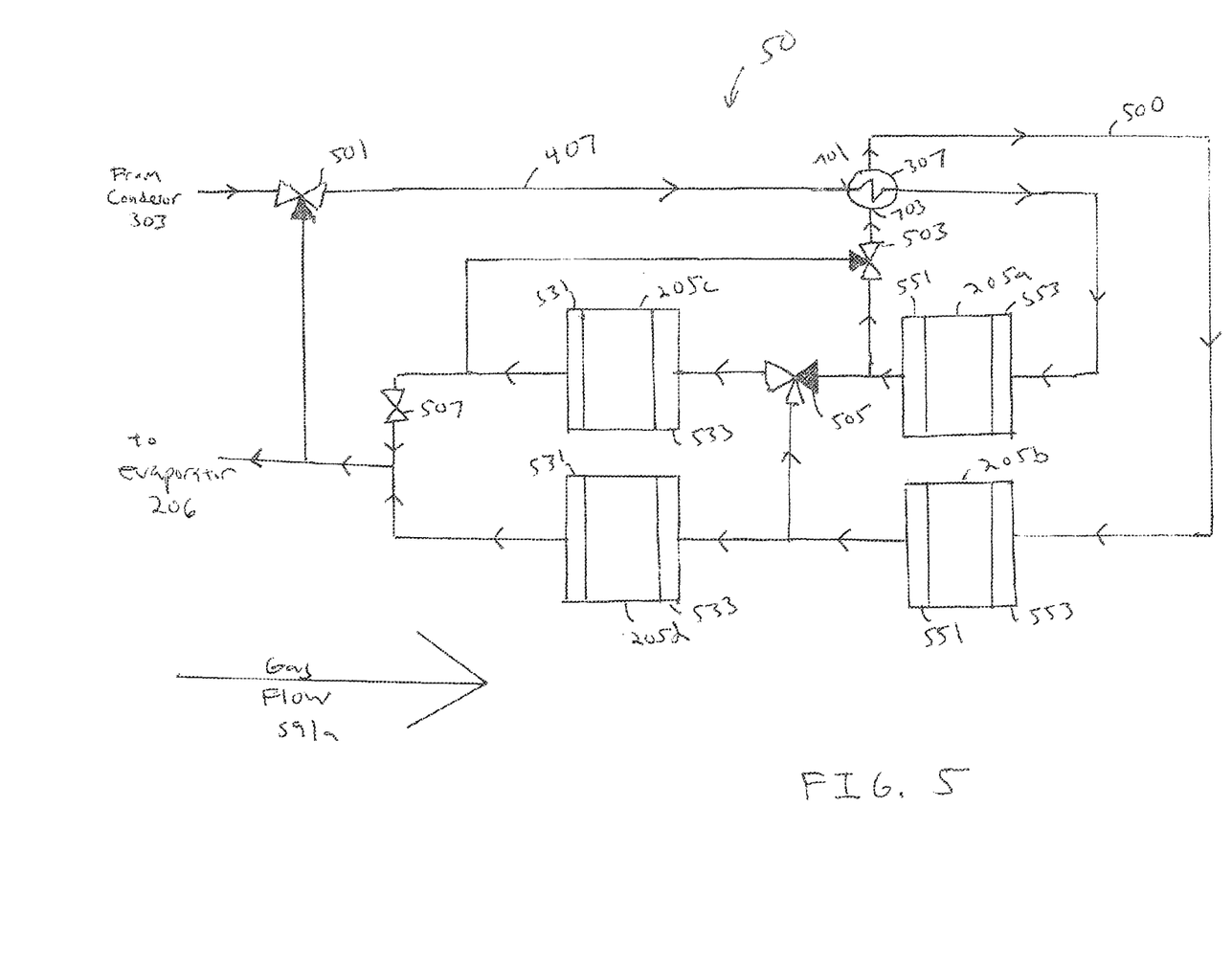
FIG. 5 shows the combination of FIG. 4 with the valves arranged for natural gas operation.
Figure 6:
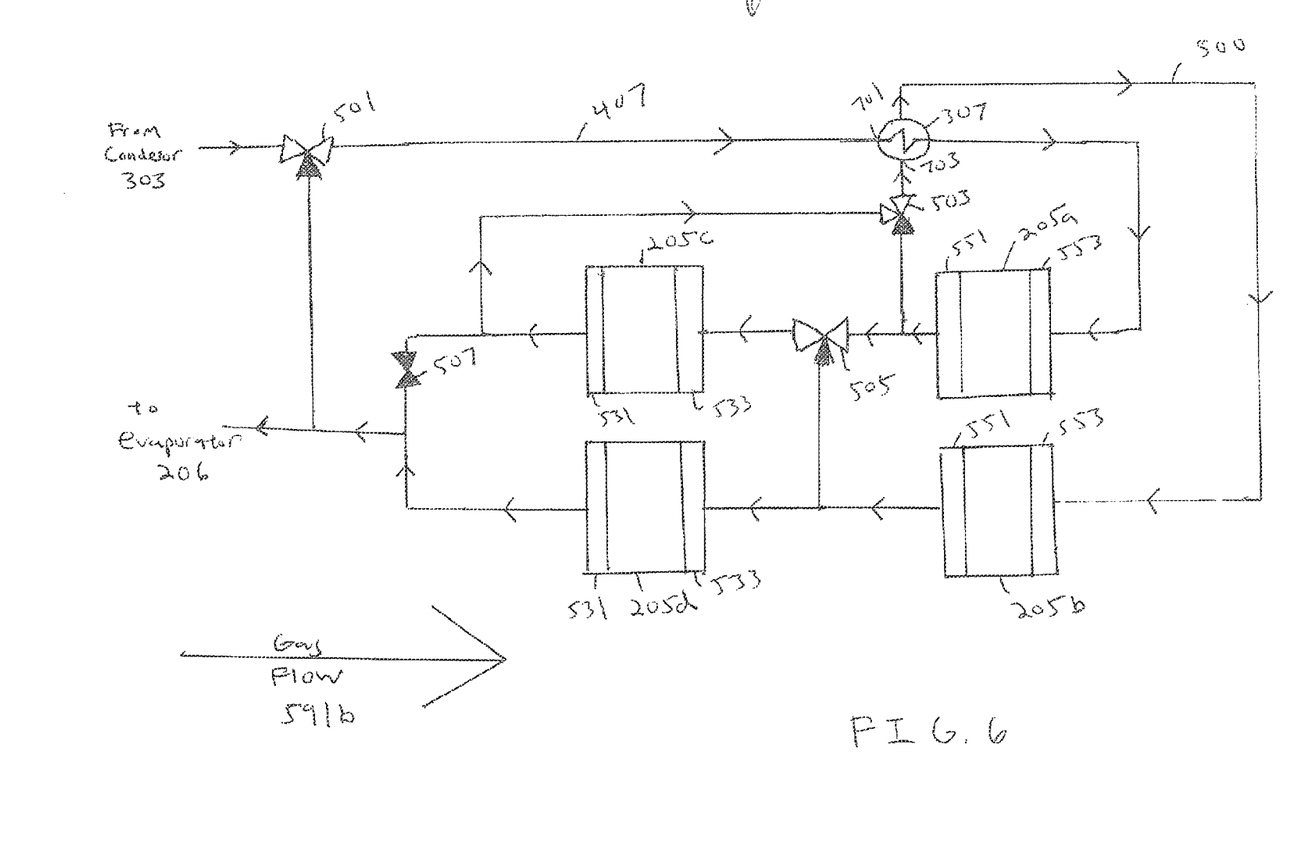
FIG. 6 shows the combination of FIG. 4 with the valves arranged for oil operation.

This arrangement provides for at least two different valve configurations as shown in FIGS. 5 and 6. Generally, the valves (503), (505), and (507) of the system (50) will be adjusted at generally the same time so that the system (50) is operated in either the configuration of FIG. 5 or the configuration of FIG. 6 and not in any other configuration. However, one of ordinary skill in the art would understand that alternative arrangements may be beneficial in some circumstances and that the configurations of FIGS. 5 and 6 should not be seen as limiting because other alternative configurations could be used.

It should be recognized that, while the embodiment of FIG. 4 shows four sections for the economizer (205), more sections may be used depending on the size and desired flexibility of the system (50). Specifically, in a larger system (50), the economizer (205) may be arranged in any number of additional sections which operate in accordance with the principles of the sections discussed below in conjunction with FIGS. 5 and 6. Further, as a component, the low pressure economizer (205) is defined more by a matter of function than not, and the sections (205a), (205b), (205c), and (205d) could also be considered for use in any other portion (e.g. the high pressure economizer (207), the low pressure evaporator (203), the high pressure evaporator (206), or the superheater (201)) in a different embodiment. Generally, there will be an even number of sections provided for the economizer (205) so that each pair operates in the manners discussed, but likewise this also is not required.

FIG. 5 shows a valve arrangement as would be used if less preheating of feedwater (407) was required. This is commonly the arrangement that would be used in the gas flow (591a) is from the burning of natural gas or another feed material that is relatively low in sulfur. Thus, the gas flow (591a) will generally contain a relatively smaller amount of sulfur compared to the gas flow (591b) of FIG. 6. That means the desired feedwater (407) temperature at the time it enters the duct (101) (i.e., leaves the heat exchanger (307) and enters section (205a) or (205b)) will generally be about 140° F.

In FIG. 5, the liquid flow will generally be as indicated by the arrows on the piping (500). Further, the "blacked-out" valve portions are closed, preventing water from flowing through them. Feedwater (407) will come from condenser (303) through the bypass valve (501) without the bypass valve (501) being set to bypass the system (50). Thus, the feedwater (407) will flow into the cold input (701) of the heat exchanger (307) where it will be preheated by the heat exchanger (307). Once preheated, the feedwater (407) will enter the duct (101) and flow into the downstream face (553) of the first section (205a) of the economizer (205). The feedwater (407) is heated in the first section (205a) and then exits the upstream face (551) where it passes through the valve (503) and into the hot input (703) of the heat exchanger (307).

Heat will be exchanged with the incoming feedwater (407) at the cold input and the feedwater (407) will flow into the downstream face (553) of the second section (205b) of the economizer (205). Generally, the feedwater flowing into the downstream faces (553) of both the first (205a) and second section (205b) will be above, and relatively close to, 140° F. The feedwater (407) will then flow from the upstream face (551) of the second section (205b) of the economizer (205) through sections (205c) and (205d) and to the evaporator.

As should be apparent from the above description, the feedwater pathway up until this point matches the pathway of both economizers (205) of FIGS. 2 and 3 where the feedwater (407) flows through the cold input (701) of the heat exchanger (703), through one section (205a) of the economizer (205), into the hot input (703) of the heat exchanger (307), and through the other section (205b) of the economizer (205). This is therefore the same general arrangement as discussed for those devices showing that this valve arrangement will generally be sufficient to convert about 90° F. to about 100° F. feedwater at the condenser (303) to at least and about 140° F., which is suitable for operation of the pipe arrangement (500) in a lower sulfur (e.g. natural gas combustion product) exhaust flow (591a).

Once through the economizer sections (205a) and (205b), the feedwater (407) will be split into two pathways by the valve (505), which independently flow into the downstream faces (533) and out the upstream faces (531) of the latter two sections of the economizer (205c) and (205d). Generally about half the feedwater (407) flow will go through each section (205c) and (205d). The feedwater (407) streams may be recombined through the valve (507) and sent out to the evaporator (206) to be evaporated in any conventional manner known to one of ordinary skill.

As should be apparent from the above, the layout of FIG. 5 is essentially identical to the arrangement of FIG. 2 or 3 except that the layout of FIG. 5 utilizes two sections (205c) and (205d) of the economizer (205) with the flow split evenly between them as opposed to a single section. These two sections (205c) and (205d) will generally be arranged in parallel to simply duplicate the function of a traditional single section economizer (205), but that is by no means required and alternative designs with the sections (205c) and (205d) offset from each other, or arranged in series, could be used in alternative embodiments, if desired.

While the arrangement of FIG. 5 is sufficient to preheat the feedwater (407) with the heat exchanger (307) for a relatively low sulfur gas flow (591a), it will generally not be sufficient if the gas flow (591b) has higher sulfur. This would occur, in an embodiment, where a primarily natural gas fired power plant switched over to an alternative fuel, such as, but not limited to, fuel oil (including but not limited to, #2 fuel oil or #6 fuel oil), in an emergency situation, or to deal with a natural gas price increase. In a still further embodiment, it could occur if a relatively low sulfur exhaust gas (591a) generated from the combustion of primarily organic municipal waste was shifted over to a higher sulfur exhaust gas (591b) such as from coal combustion. In a yet further embodiment, the low sulfur exhaust gas (591a) could be from a relatively low sulfur coal feed while the higher sulfur exhaust gas (591b) is from a higher sulfur (lower quality) coal feed.

Regardless of the reason why the exhaust flow (591) increases in sulfur, when an operator is aware that the sulfur content of the exhaust flow (591) is going to be sufficiently increased, the system (50) of FIG. 4 will be shifted from the arrangement of FIG. 5 to that of FIG. 6. The increase will generally be considered sufficient to switch if the temperature of the feedwater (407) entering the downstream faces (553) of one or both sections (205a) and (205b) is below the dew point of the exhaust gas (591) when the system (50) is operating in the configuration of FIG. 5. Again, in FIG. 6, the arrows on the pipe arrangement (500) indicate the flow of feedwater (407) and the blacked-out indicators on the valves (501), (503), (505), and (507) indicate that flow through that arm of the valve is prohibited.

In the operation of FIG. 6, the feedwater (407) again comes from the condenser (303) and passes through the bypass valve (501) and into the system (50). As should be apparent, the bypass valve (501) is in the same position in the arrangements of both FIGS. 5 and 6 as the bypass valve (501) is not used to alter the flow pattern through the economizer (205), but to avoid it entirely. As a bypass operation (where flow of the feedwater (407) would be from the condenser (303) through the valve (501) and directly to the evaporator (206) (or more accurately another bypass valve)) is conventional, it is not further discussed here.

The feedwater (407) again passes into the cold input (701) of the heat exchanger (307) and into the downstream face (553) of the first section (205a) of the economizer (205). The feedwater (407) passes out the upstream face (551) of the section (205a) but is now blocked from returning to the heat exchanger (307) by the closed portion of the valve (503). Instead, the feedwater (407) now enters the downstream face (533) of the economizer section (205c). It then passes out the upstream face (531) of the section (205c) and the closed valve (507) sends it up through the open portion of the valve (503) and into the hot input (703) of the heat exchanger (307) where it will exchange heat with the incoming cold water.

It should be apparent that the feedwater (407) entering the hot input (703) of the heat exchanger (307) in FIG. 6 is significantly hotter than the feedwater (407) entering the hot input (703) of the heat exchanger (307) in FIG. 5, as the feedwater (407) will have passed through both section (205a) and section (205c) as opposed to simply section (205a). Thus, the feedwater (407) coming in the cold input (701) of the heat exchanger (307) will be heated to a significantly greater temperature in FIG. 6 than in FIG. 5, prior to the feedwater (407) being supplied to economizer section (205a). Similarly, because the feedwater (407) at the hot input (703) of the heat exchanger (307) is hotter in FIG. 6 than in FIG. 5, the feedwater (407) leaving the heat exchanger (307) to the economizer section (205b) is also hotter in FIG. 6 compared to FIG. 5.

Depending on the embodiment and the desired input temperature, the feedwater (407) leaving the heat exchanger (307) of FIG. 6 could be as high as 230° F., 240° F., 280° F., or greater. These temperatures could be particularly valuable if the exhaust gas (591b) was from #2 fuel oil. In another embodiment, the feedwater (407) leaving the heat exchanger (307) may only be 160° F. or more, which may be suitable if other feedstocks were being used, but is generally hotter than is otherwise needed for natural gas. It should be apparent that the specific temperature that the feedwater (407) leaves the heat exchanger (307) can be selected in both the lower temperature and higher temperature arrangements based on the size and positioning of the portions (205c) and (205a). Thus, while the temperature of feedwater (407) leaving the heat exchanger (307) in FIG. 6 will always be hotter than that of FIG. 5, the exact amount, or difference between the amounts, can be variable depending on the expected composition of exhaust gases (591a) and (591b) or other factors known to one of ordinary skill.

Once the feedwater (407) has passed through the hot input (703) of the heat exchanger (307), it will enter the second section (205b) of the economizer (205), passing from the downstream face (553) to the upstream face (551), and then, due to the closed valve (505), the feedwater (407) will pass into the downstream face (533) of the fourth section (205d) of the economizer (205). The feedwater (407) will then pass out the upstream face (531) of section (205d) and be directed by the closed valve (507) to the evaporator (206). Thus, the feedwater (407) goes through the two sections (205c) and (205d) at different times in FIG. 6 as opposed to generally simultaneously in FIG. 5.

It should be apparent that, in the arrangement of FIG. 4 where the two portions of the economizer (205a) and (205b) are parallel and the economizer sections (205c) and (205d) are parallel, which section (205c) or (205d) of economizer (205) and which section (205a) and (205b) of the economizer (205) are used on which leg of the feedwater (407) passage are generally interchangeable. In an arrangement where the sections of the economizer (205) are arranged in series, the valve arrangements will generally be done such that the feedwater (407) will pass through the upstream section (205d) and (205b) second in both arrangements. This comports with the use of the reference numbers herein between FIGS. 2 and 4. Thus, the sections (205d) and (205b) will generally be upstream of the related sections (205c) and (205a) with a non-parallel arrangement.

As should be apparent from the above, when the system (50) is placed in the arrangement of FIG. 6, the feedwater (407) from the condenser (303) is preheated to a significantly higher temperature than in the arrangement of FIG. 5. Thus, there is a reduced likelihood of sulfuric acid condensation being formed on the downstream tubes (553) of the various sections of the economizer (205), even in higher sulfur exhaust gases (591b) are present or if there is another reason that the dew point in the exhaust gases (591b) is higher than that of exhaust gases (591a). Thus, the system (50) can be switched from the arrangement of FIG. 5 to that of FIG. 6 when a feedstock is used which has greater sulfur content, such as when the power plant runs on #2 fuel oil as opposed to natural gas.

While the invention has been disclosed in connection with certain preferred embodiments, this should not be taken as a limitation to all of the provided details. Modifications and variations of the described embodiments may be made without departing from the spirit and scope of the invention, and other embodiments should be understood to be encompassed in the present disclosure as would be understood by those of ordinary skill in the art.

It will further be understood that any of the ranges, values, or characteristics given for any single component of the present invention can be used interchangeably with any ranges, values, or characteristics given for any of the other components of the invention, where compatible, to form an embodiment having defined values for each of the components, as given herein throughout.

The invention claimed is:

1. A piping system for transferring heat from an exhaust gas flow to a feedwater comprising:
    an economizer including:
        a first section;
        a second section;
        a third section; and
        a fourth section;
        wherein said first section, said second section, said third section, and said fourth section are within said gas flow;
    a heat exchanger which is not within said exhaust gas flow and having a cold input and hot input; and
    a plurality of valves comprising;
        a first three-way valve positioned between an upstream face of said first section of said economizer, an upstream face of said third section of said economizer, and said hot input of said heat exchanger;
        a second three-way valve positioned between an upstream face of said first section of said economizer, an upstream face of said second section of said economizer, and a downstream face of said third section of said economizer; and
        a first two-way valve positioned between an upstream face of said third section of said economizer and an upstream face of said fourth section of said economizer;
    wherein said valves in said plurality of valves can be arranged in a first configuration so a feedwater passes through the system in the following order:
        a) said cold input of said heat exchanger;
        b) said first section of said economizer;
        c) said hot input of said heat exchanger;
        d) said second section of said economizer; and
        e) at least one of said third and said fourth section of said economizer in-any order; and
    wherein said valves in said plurality of valves can be arranged in a second configuration so a feedwater passes through the system in the following order:
        a) said cold input of said heat exchanger;
        b) said first section of said economizer;
        c) said third section of said economizer;
        d) said hot input of said heat exchanger;
        e) said second section of said economizer; and
        f) said fourth section of said economizer.

2. The system of claim 1, wherein said exhaust gas flow is selected from the group consisting of: exhaust gas from the combustion of natural gas and exhaust gas from the combustion of #2 fuel oil.

3. The system of claim 2, wherein said valves in said plurality of valves are arranged in said first configuration when said exhaust gas is from the combustion of natural gas and in said second configuration when said exhaust gas is from the combustion of #2 fuel oil.

4. The system of claim 1, wherein said first section of said economizer and said second section of said economizer are arranged in parallel relative to said exhaust gas flow.

5. The system of claim 1, wherein said first section of said economizer and said second section of said economizer are arranged in series relative to said exhaust gas flow.

6. The system of claim 1, wherein said third section of said economizer and said fourth section of said economizer are arranged in parallel relative to said exhaust gas flow.

7. The system of claim 1, wherein said third section of said economizer and said fourth section of said economizer are arranged in series relative to said exhaust gas flow.

8. The system of claim 1, wherein said plurality of valves further includes a bypass valve which allows for said feedwater to either:
    enter the cold input of said heat exchanger; or
    bypass said economizer.

9. The system of claim 1, wherein said feedwater entering said cold input is between about 90° F. and about 100° F.

10. The system of claim 9, wherein, when said valves are in said first configuration, said feedwater entering said first section of said economizer is above 140° F.

11. The system of claim 1, wherein said system is part of a heat recovery steam generator (HRSG).

12. The system of claim 1, wherein after said feedwater has passed through either said first configuration or said second configuration, said feedwater is passed to a low pressure evaporator.

13. A method for controlling the flow of a liquid through a device for exchanging heat between a gas and a liquid, the method comprising:
    providing a device for exchanging heat between a gas and a liquid, the device including:
        an economizer including:
            a first section;
            a second section;
            a third section; and
            a fourth section;
            wherein said first section, said second section, said third section, and said fourth section are within said gas flow;
        a heat exchanger which is not within said exhaust gas flow and having a cold input and hot input;
    using said device in a first configuration wherein liquid passes through the components of the device in the following order:
        a) said cold input of said heat exchanger;
        b) said first section of said economizer;
        c) said hot input of said heat exchanger;
        d) said second section of said economizer; and
        e) at least one of said third and said fourth section of said economizer;
    when a first exhaust gas forms said exhaust gas flow; and
    using said device in a second configuration wherein liquid passes through the components of the device in the following order:
        a) said cold input of said heat exchanger;
        b) said first section of said economizer;
        c) said third section of said economizer;
        d) said hot input of said heat exchanger;
        e) said second section of said economizer; and
        f) said fourth section of said economizer;
    when a second exhaust gas, different from said first exhaust gas, forms said exhaust gas flow.

14. The method of claim 13, wherein said first exhaust gas is exhaust gas from the combustion of natural gas and said second exhaust gas is exhaust gas from the combustion of #2 fuel oil.

15. The method of claim 13, wherein said first exhaust gas has a lower sulfur content than said second exhaust gas.

16. The method of claim 13, wherein said first section of said economizer and said second section of said economizer are arranged in parallel relative to said exhaust gas flow.

17. The method of claim 13, wherein said first section of said economizer and said second section of said economizer are arranged in series relative to said exhaust gas flow.

18. The method of claim 13, wherein said third section of said economizer and said fourth section of said economizer are arranged in parallel relative to said exhaust gas flow.

19. The method of claim 13, wherein said third section of said economizer and said fourth section of said economizer are arranged in series relative to said exhaust gas flow.

20. The method of claim 13, wherein said liquid entering said cold input is between about 90° F. and about 100° F.

21. The method of claim 13, wherein, in said first configuration, said liquid entering said first section of said economizer is above 140° F.

22. The method of claim 13, wherein, in said second configuration, said liquid entering said first section of said economizer is above 230° F.

23. The method of claim 13, wherein said method is performed in a heat recovery steam generator (HRSG).

* * * * *